United States Patent

Philips et al.

[15] 3,678,922
[45] July 25, 1972

[54] DILUTION METHOD AND APPARATUS FOR MEASUREMENT OF FLUID FLOW RATE

[72] Inventors: Charles M. Philips, Philadelphia, Pa.; Miguel E. Sanmarco, San Francisco, Calif.

[73] Assignee: Temple University, Philadelphia, Pa.

[22] Filed: Jan. 14, 1971

[21] Appl. No.: 106,340

[52] U.S. Cl............................................128/2.05 F, 73/204
[51] Int. Cl.............................................................A61b 5/02
[58] Field of Search.....................128/2.05 F, 2.05 V, 2.05 R, 128/2 A, 2 R; 73/204, 194

[56] References Cited

UNITED STATES PATENTS

| | | | |
|---|---|---|---|
| 3,269,386 | 7/1963 | Sherman | 128/2.05 F |
| 3,433,935 | 3/1969 | Sherman | 128/2.05 F |
| 3,618,591 | 11/1971 | Bradley et al. | 128/2.05 F |

OTHER PUBLICATIONS

I.E.E.E. Transactions on Bio-Medical Engineering., Vol. 17, No. 4, Oct. 1970, pp. 335–338.

*Primary Examiner*—Kyle L. Howell
*Attorney*—Paul & Paul

[57] ABSTRACT

A dilution technique for measuring fluid flow rate within a circulating fluid system is disclosed, comprising continuous processing of a response signal following injection of an injectate into the fluid system, the process being terminated at a cut off point which is determined in terms of the peak of the response signal. The cut off point of the response signal is determined to compensate for error normally introduced due to recirculation. Apparatus is disclosed for carrying out the steps of the process, comprising an integrator-divider for processing the response signal, a peak detector and comparator for terminating the signal processing at the cut off point, and a lock in amplifier to hold the computed result during the period of recirculation. The method and apparatus for particularly applicable to thermal dilution and dye dilution measurements of blood flow rate.

10 Claims, 3 Drawing Figures

Patented July 25, 1972

INVENTORS.
CHARLES M. PHILIPS
MIGUEL E. SANMARCO
BY
Paul & Paul
ATTORNEYS.

INVENTORS.
CHARLES M. PHILIPS
MIGUEL E. SANMARCO
BY
Paul & Paul
ATTORNEYS.

3,678,922

DILUTION METHOD AND APPARATUS FOR MEASUREMENT OF FLUID FLOW RATE

BACKGROUND OF THE INVENTION

The invention described herein was made in the course of work under a grant or award from the Department of Health, Education and Welfare.

1. Field of the Invention

This invention lies in the field of fluid flow rate measurement techniques and apparatus for performing same and, more particularly, a dilution method and apparatus for providing reduced error measurement of liquid flow rate. The preferred embodiment is particularly suitable for thermal dilution measurement of cardiac output.

2. Description of the Prior Art

Determination of cardiac output has become an important process in many medical applications. In recent years, a number of computers have been disclosed, and some introduced commercially, for calculation of cardiac output by either the dye dilution or thermal dilution technique. In the dye dilution technique, dye of a specific color is prepared and injected into the circulation system, the blood color is sensed some distance downstream from the heart, and cardiac output is determined by processing a signal representing the sensed variation of blood color versus time.

The thermal dilution technique consists of the injection of room temperature saline into a blood vessel, the sensing of blood temperature some distance downstream from the heart by a thermistor in a catheter, and processing of the resulting temperature curve for determination of cardiac output. Generally speaking, the thermal dilution technique affords certain advantages over the dye dilution technique, including the fact that thermal recirculation after one cycle through the blood stream is less than the color recirculation following a dye injection.

While the thermal dilution technique affords definite advantages, presently used methods and apparatus for performing it still introduce an inherent error due to the thermal recirculation. The basic processing step comprises determining the area under the temperature curve, the blood flow rate being mathematically related to such area. While the mathematical relationship is precise, the problem resides in the fact that no precise determination of the area can be made, due to the fact that the blood temperature does not return precisely to its prior level, but maintains a residual recirculation change in temperature. In the dye dilution technique, there is an even greater percentage residual circulation of color change. Prior processes attempted to extrapolate the temperature curve, arithmetically or logarithmetically, in order to obtain an approximation of the true area. However, the extrapolation technique remains subject to considerable error, and does not readily permit repeatable testing.

SUMMARY OF THE INVENTION

It is an object of this invention to provide a dilution method, and apparatus for performing such method, whereby a dilution response signal is accurately and rapidly processed to obtain a reliable indication of fluid flow rate.

It is a further object of this invention to provide a method of thermal dilution determination of cardiac output, and apparatus therefor, which overcomes the disadvantages of the prior art, and is reliable and inexpensive to operate.

Accordingly, the preferred embodiment of this invention discloses a thermal dilution method of injecting a saline solution into the bloodstream, monitoring the resulting temperature response at a point downstream from the heart, truncating, or cutting off such temperature response signal when it has dropped to a predetermined fraction of the peak temperature response, automatically operating on such truncated response curve in accordance with the mathematical relationship between cardiac output and such curve, and holding the determined value of cardiac output subsequent to the cut off point. The apparatus disclosed comprises conventional temperature sensing means including a thermistor in a cathether, an integrator having an automatic base line feature, standard components for continuously processing the sensed temperature response curve, a cut off circuit which automatically determines the cut off point in terms of the peak temperature response, and means for holding a display of the calculated cardiac output subsequent to cut off.

DESCRIPTION OF THE PREFERRED EMBODIMENT

In practicing the thermal dilution method of measuring cardiac output, a thermistor is housed in a catheter, the catheter being placed at a desired location in the bloodstream, where the thermistor assumes body temperature. When injection of saline at room temperature is made, the blood is cooled typically on the order of 0.4° C for a time duration of several seconds. A typical thermistor such as used in this application has a resistance of 1200 – 1400 ohms at 37° C, which resistance increases with decreasing temperature at a rate of approximately 40 ohms per degree centigrade. The thermistor is connected through leads implanted in the catheter to a bridge and preamplifier circuit, as indicated in FIG. 2, which produces an output signal representing the detected variation of blood temperature. This electrical representation, hereinafter referred to as the temperature response curve, is shown schematically in FIG. 1. The curve is a skewed, bell-shaped curve, having a relatively sharp rise and exponential drop off, the curve not returning to the original base line but rather levelling off at a given recirculation level, reflecting the thermal inertia of the saline solution.

Figure 1:
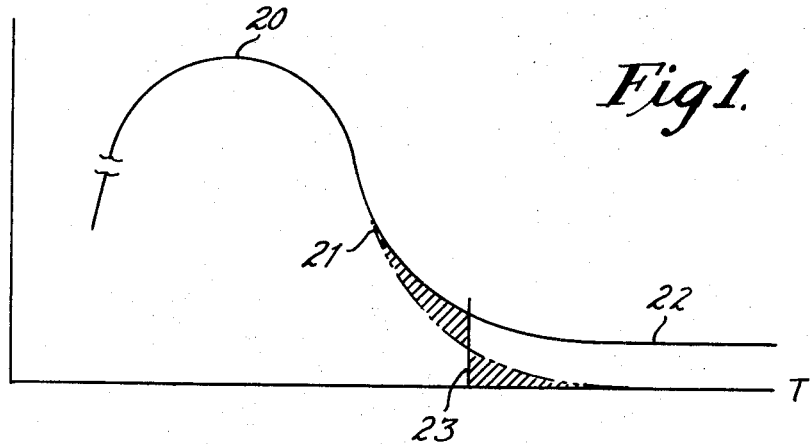
FIG. 1 is a graph of a typical thermal dilution curve, showing temperature versus time.
Figure 2:
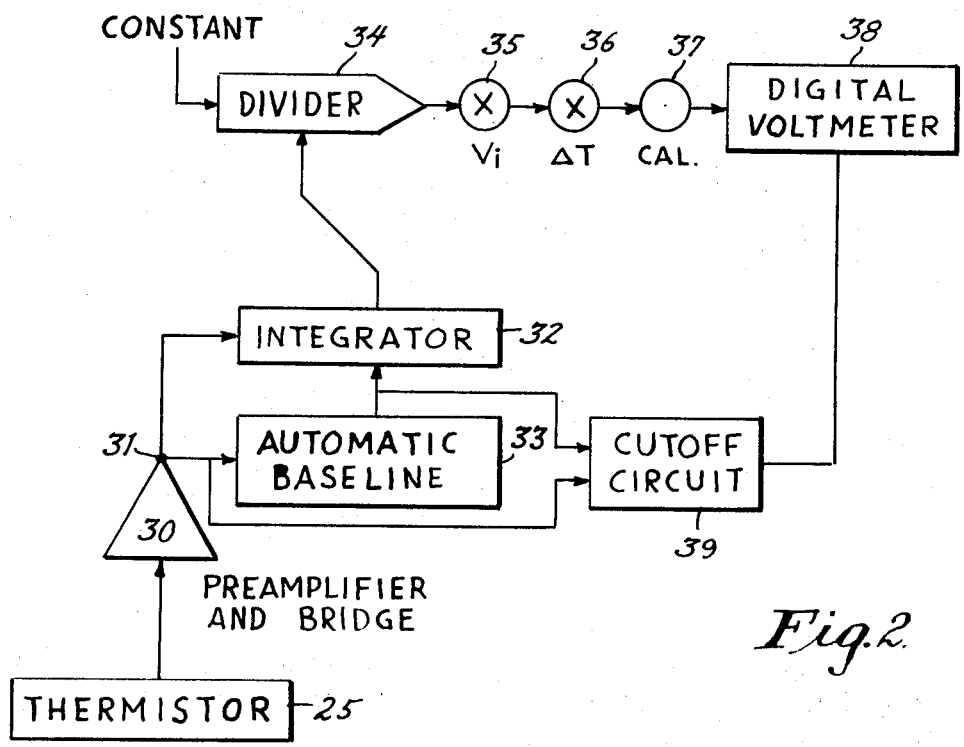
FIG. 2 is a block diagram of the apparatus of this invention.

The temperature response curve as shown in FIG. 1 is illustrative only, and is not represented as being drawn to scale. The peak of the curve, representing the maximum change of temperature due to the injection of saline, is indicated by numeral 20. At the position of the curve indicated by numeral 21, the curve begins to depart from the typical exponential response which would result in the absence of the recirculation phenomenon. The solid line, indicating actual response, terminates in a level portion 22 which is an indication of recirculation, this being typically about 4 percent of the peak value 20. The dashed line, extending from point 21 to the base line, indicates the projected mathematical expression of the curve in the absence of recirculation.

Examination of the curve, as illustrated in FIG. 1, shows that the curve which would accurately represent cardiac output (absent recirculation) is represented by the solid line up to point 21, and by the dashed line from point 21 to the point where it intercepts the time base line. The error introduced by recirculation is represented by the vertical spacing between the solid line and the dashed line, which error approaches a constant with time as the curve straightens out along portion 22. This nearly constant temperature error results in a continuously increasing ramp when integrated.

The relation between cardiac output, designated as CO, and the response curve of FIG. 1, is given by the following equation: $CO = KV_i \Delta T/\text{area}$, where $V_i$ represents the volume of saline injected, $\Delta T$ represents the temperature difference between the injected saline and the blood, area represents the area under the temperature versus time curve, and $K$ is a constant dependent upon the units chosen. From this equation, it is seen that a first step in the processing of the monitored signal is to obtain an integral of the curve representing the area. Examination of the temperature response curve shows that there is a given time 23, corresponding to the vertical line drawn on FIG. 1, such that the shaded area between the solid line and the dashed line prior to time 23 exactly equals the shaded area between the dashed line and the base line subsequent to time 23. Thus, time 23 is the optimum cut off time defined such that the integral of the solid line from the beginning of the temperature response curve to time 23 equals the integral of the theoretical response curve. This being the case, integration of the detected response curve to the cut off point results in the proper value of area to be used in the above formula.

For any chosen value of cut off time, the magnitude of the actual error is a function of the value of recirculation. The optimum choice of cut off time is, correspondingly, also a function of the amount of error introduced when the recirculation changes from the assumed level. In order to determine such variation of error, various dilution curves were simulated on an analog computer, the simulated thermal curve having a variable recirculation of 0 to 8 percent of the peak value. The simulated curves in turn were computer processed to determine calculated values of cardiac output. The results of this analog computer simulation are shown in the following table:

| Recirculation (percent) | Cut Off (percent) | | | | |
|---|---|---|---|---|---|
| | 6 | 10 | 12 | 20 15 | 25 |
| 0 | +2 | +4 | +5 | +10 +7 | +13 |
| 2 | −2 | +2 | +3 | +8 +5 | +12 |
| 3 | −4 | +1 | +2 | +8 +1 | +11 |
| 4 | −7 | 0 | +1 | +7 +4 | +10 |
| 8 | −5 | | −3 | +5 +1 | +9 |

TABLE I

Cardiac Output Error (percent) vs. Cut Off, with recirculation as a parameter.

It is seen from the above table that a 12 percent cut off point is the theoretical optimum for recirculation values in the range of 2 to 8 percent, as the error under such conditions is within the range of ± 3 percent. However, with a 10 percent cut off point, the predicted cardiac output error is 0 percent for the usual 4 percent recirculation, and only at the 8 percent recirculation rate was the error greater than 2 percent. On the basis of this, the figure of 10 percent is chosen as an optimum cut off point.

Referring now to FIG. 2, a block diagram is shown illustrating the operation of the apparatus of this invention. Thermistor 25 is connected through the catheter to a preamplifier and bridge circuit 30, the output of which appears at node 31. It is this output which is shown as the temperature response curve in FIG. 1. The temperature response signal is fed into integrator 32, the output of which is in turn coupled to divider 34, dividing the area signal coming from integrator 32 into a predetermined constant. The output of divider 34 is coupled through multiplier pots 35 and 36, providing multiplication by $V_i$ and $\Delta T$ respectively. The output from pot 36 is subsequently transferred through a calibration pot 37, and thence to a digital voltmeter or equivalent display output 38.

In order to reduce error due to base line drift, the temperature response curve at point 31 is fed into an automatic base line circuit 33, which produces a signal which is connected to integrator 32 of such a polarity so as to cancel any base line signal introduced into integrator 32. The base line output and the temperature response curve are also connected to a cut off circuit 39 which detects the peak 20 of the temperature response curve, and produces an output signal when the response curve drops to 10 percent of such peak, thereby producing a stop signal at time 23. The stop signal is communicated to display device 38, causing such device to hold the computed signal at the cut off time, until the apparatus is reset for the next measurement.

Figure 3:
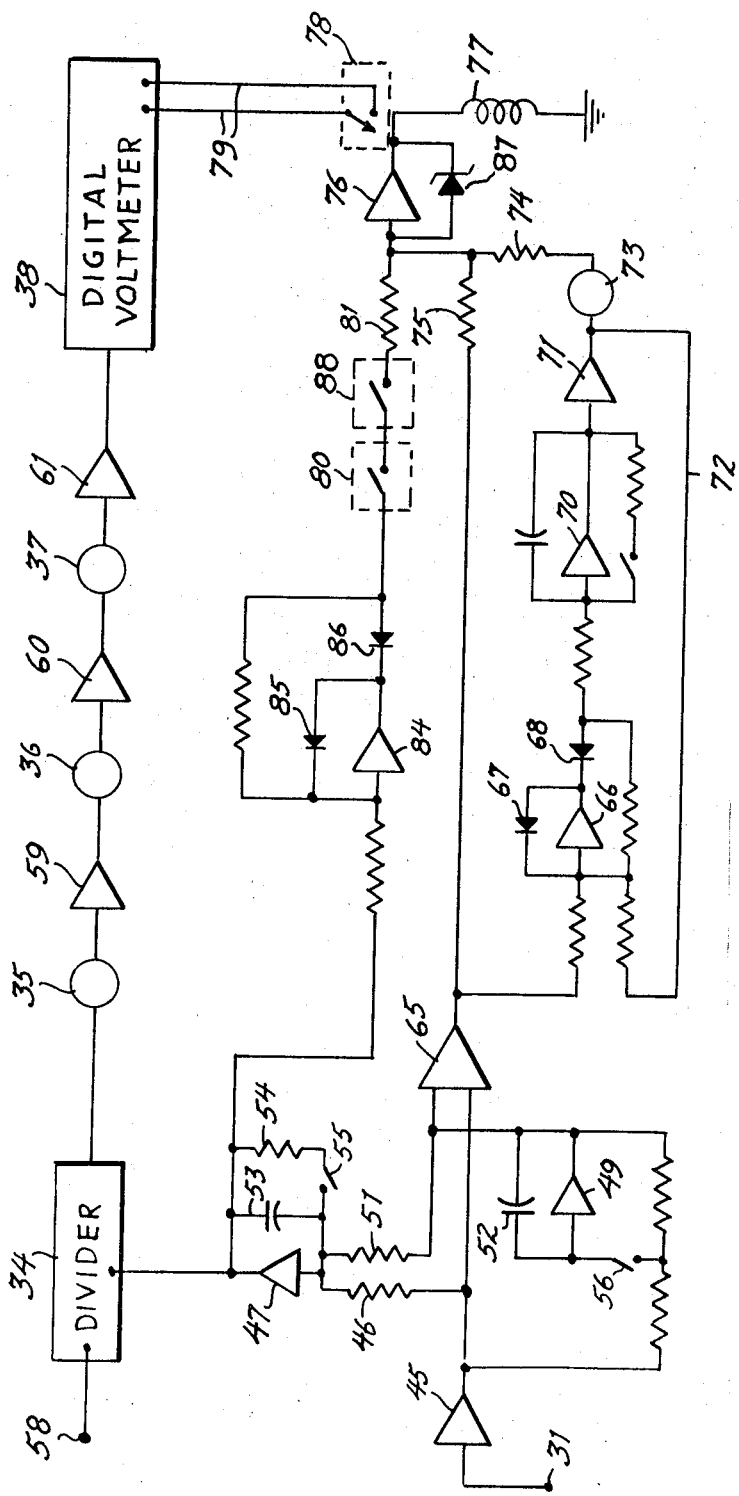
FIG. 3 is a circuit diagram of the thermal dilution computer of this invention.

Referring now to FIG. 3, the temperature response signal at node 31 is inverted by amplifier 45, and connected through input resistor 46 to integrator amplifier 47, having capacitor 53 connected between input and output. The integrator is reset to zero just prior to saline injection by switch 55, which switches resistor 54 across capacitor 53. The output of integrator amplifier 47 is connected to divider 34, which may be any conventional unit. For example, a quarter-square divider unit has been used for dividing the integral signal into an arbitrary constant introduced at terminal 58. The output of divider 34 is fed through pots 35, 36 and 37 as described above. Buffer amplifiers 59, 60 and 61 are utilized in a standard manner known in the art to prevent the loading of the respective potentiometers. Digital voltmeter 38 may be any commercially available voltmeter, preferably one with an output indicator which can be easily read at working distances.

The output of amplifier 45 is also fed through normally closed switch 56 to amplifier 49, which acts as a unity gain inverter when switch 56 is closed, thereby tracking and inverting the base line signal. When the switch is opened just before injection, as shown in FIG. 3, capacitor 52 stores the base line voltage, which inverted base line voltage is transmitted through resistor 51 into integrator amplifier 47, such that the base line voltage is subtracted from the time response signal, giving a zero baseline result.

The temperature response signal from amplifier 45 is also coupled into amplifier 65, along with the output of the base line circuit, producing another zero baseline output which is always positive. This output is coupled through amplifier 66, which has diodes 67 and 68 to insure only a negative output. This negative signal is in turn connected to integrator amplifier 70, the positive output of which is inverted through amplifier 71. This negative signal is returned on connection 72 and fed into amplifier 66, where it subtracts from the positive time response signal, such that the input to amplifier 66 remains positive as long as the signal from amplifier 65 is a bit more positive than the output of amplifier 71. This condition obtains as long as the temperature curve is rising. It is noted that, in the event the negative signal from amplifier 71 exceeds the positive signal of amplifier 65, amplifier 66 produces no output, and integrator amplifier 70 holds its output until the time response signal rises. Thus, as long as the temperature response signal is rising, the output from amplifier 71 follows it, such that the input to potentiometer 73 represents the response signal.

When the temperature response signal reaches a peak and begins to descent, the effective input to amplifier 66 becomes negative, under which circumstance amplifier 66 gives a zero output, causing the output of integrator amplifier 70 to remain constant, which constant voltage represents the peak of the temperature response curve. The output of amplifier 71 is coupled through potentiometer 73, which potentiometer is set to give an output of 10 percent of the peak.

Comparator amplifier 76 is a high gain comparator which compares the temperature response signal connected through resistor 75 to the 10 percent peak signal connected through resistor 74. When the down slope of the response curve reaches 10 percent of the peak, amplifier 76 produces a response which energizes relay 77. Relay 77 in turn closes hold contact 78, causing digital voltmeter 38 to hold its reading at that point.

It is noted that as long as the temperature response curve is rising, the positive signal transmitted through resistor 75 is greater in magnitude than the negative signal transmitted through 74, such that the output of comparator amplifier 76 is zero because of zener diode 87. However, once energized at 10 percent of the peak, it is necessary to lock in relay 77, so as to prevent the reading from being lost during the recirculation period if the temperature oscillates around 10 percent of the peak figure. In order to accomplish this, the positive output of integrator amplifier 47 is inverted through amplifier 84, and connected through switch 80, normally open contacts 88 of relay 77, and resistor 81, to comparator amplifier 76. Switch 80 is normally open, and is closed at initiation of the compute operation.

The purpose of the signal transmitted through resistor 81 is to provide a negative signal to drive the output of comparator amplifier 76 more positive, holding relay 77 on independent of changes in the temperature response signal after detection of the cut off point. However, it is recognized that if a high negative voltage were immediately connected through resistor 81, the relay would lock in at the beginning of the test, preventing any reading at all. The solution is provided by this circuit, whereby amplifier 84 and resistor 81 provide a negative signal which is small at the beginning of the temperature curve, before the integral has grown to a substantial quantity, and is large after the peak is reached. At the beginning of the compute operation, before the response signal has begun to rise, relay 77 may be energized by random inputs through resistors 74 and 75. Relay 77 does not lock in, however, since the lock in signal is so small. After the temperature response signal begins to rise, and until cut off is reached, the input to the comparator through resistors 74 and 75 insures relay 77 being de-energized. Thus contact 88 is open preventing the lock in voltage from affecting the comparison of the inputs through resistors 74 and 75. But after cut off, with the continuous build up of the integral, the negative voltage connected through resistor 81 is sufficiently great to maintain a locking positive voltage at the output peak amplifier 76.

From the above it is seen that a method, and apparatus for performing same, is disclosed whereby accurate thermal dilution measurements of cardiac output may be made. By first detecting the peak of the temperature response curve, and then truncating the curve at a given percentage of the peak, error due to recirculation is reduced to a negligible level.

The automatic base line circuit acts to effectively provide a zero base line temperature response signal, which in turn is operated upon by the integrator and the cut off circuit. While it is recognized that the output of base line amplifier 49 is added to the temperature response signal within integrator amplifier 47, this operation is defined, for purposes of claiming this invention, as providing a zero base line signal at the input to amplifier 47.

This invention has been described in terms of cardiac output, which is the commonly used medical term for the blood flow rate of the heart. It is understood that the method and apparatus disclosed are not limited to use on human patients, but may be employed in determining the blood flow rate of any animal, and at any point in the circulation system. Further, the invention is applicable to fluid flow rate determination in many other applications, such as any industrial process involving dilution measurement of fluid flow rate where there is a recirculation component, or where due to the presence of noise or other factors, a method and apparatus are needed to provide a repeatable way for stopping the measurement of fluid flow rate.

As an alternate embodiment of this invention, employable where some sacrifice in accuracy is allowable, the measurement of the peak of the response curve may be eliminated, with the cut off determined by sensing when the response signal has fallen to a certain predetermined level. In the method of this embodiment, the amount of injectate which carries the sensed property, e.g., dye or saline, is constrained such that the peak of the response curve falls within a certain range. For example, the amount of injectate may be controlled such that the peak of the response curve is limited to a range from one-half to full scale value of the response signal. The cut off is then determined when the signal has fallen to a fixed percentage of the full scale value, which is a predetermined level. The accuracy of this embodiment thus depends upon the degree of constraint placed upon the allowed variance of the peak. This alternate embodiment accordingly provides measurement of fluid flow rate with simplified apparatus, since the peak detector circuitry can be eliminated. Instead of amplifiers 66, 70 and 71, it is necessary only to connect a reference voltage to pot 73, with pot 73 being adjusted to provide at its output the chosen percentage of full scale voltage.

While specific analog apparatus for computation has been described, it is noted that standard digital computer apparatus, in combination with analog-to-digital equipment known in the art, may be utilized in performing some of the steps of the methods of this invention. For example, a digital computer may be programmed to detect the response signal peak, calculate the cut off point, and perform the required mathematical operations of integration, division and multiplication. In such case, no lock-in means is required.

We claim:

1. A dilution method for determining fluid flow rate of a fluid system by automatic processing of a detected dilution response signal, comprising:
   a. injecting a predetermined amount of injectate into the fluid system, which injectate carries a sensible property;
   b. generating a response signal representing the variation of said property at a point following injection;
   c. detecting the peak of said signal;
   d. detecting when said signal drops to a predetermined percentage of said peak, said condition defining the cut off time;
   e. integrating said response signal to derive a time varying area signal, and dividing said area signal into a predetermined constant, to derive a time varying output signal; and
   f. holding and displaying the value of said output signal as computed at said cut off time, such cut off value representing fluid flow rate with recirculation error reduced to a negligible level.

2. The method of claim 1 wherein said fluid flow rate represents cardiac output, and said response signal is a temperature response signal, and comprising the steps of injecting a predetermined amount of saline of a know temperature into the bloodstream of a patient and deriving said temperature response signal by detecting the temperature of said patient at a point in the bloodstream, subsequent to such injection.

3. A thermal dilution method for determining cardiac output of a patient by automatic processing of a temperature response signal representing blood temperature variation following injection of saline at a know temperature into such patient's bloodstream, comprising:
   a. detecting the peak of said signal;
   b. detecting when said signal drops to a predetermined percentage of said peak, said condition defining the cut off time;
   c. automatically integrating said temperature response signal from the time of saline injection to said cut off time, to derive an area signal; and
   d. automatically dividing said area signal into a first predetermined constant, and multiplying by a second predetermined constant, to derive an output signal representative of the patient's cardiac output with recirculation error reduced to a negligible level.

4. Apparatus for automatically computing the cardiac output of a patient by analysis of blood variation following injection of an injectate carrying a sensible property into the patient's bloodstream, comprising:
   a. sensing means, adapted for insertion into a patients' bloodstream for deriving a response signal representative of said blood variation;
   b. automatic base line means which operates on said response signal, for providing a zero base line response signal;
   c. automatic integrator means, for integrating said zero base line response signal, to derive an integrated signal;
   d. computing means for dividing said integrated signal into a first predetermined constant to obtain a divided signal, and for multiplying said divided signal by a second predetermined constant, to obtain an output signal;
   e. display means, for displaying said computed output signal; and
   f. cut off means, for determining a cut off time when said response signal falls to a predetermined percentage of its peak value, and for causing said display means to hold the value of said output signal as computed at the cut off time, which value represents computed cardiac output.

5. The apparatus as described in claim 4 wherein said injectate is saline of a know temperature, and said sensing means comprises temperature sensing means for deriving a temperature response signal representative of blood temperature variation.

6. The apparatus as described in claim 5 wherein said cut off means comprises a peak detector which operates on said zero baseline signal to produce a peak signal, connecting means to provide said percentage of said peak value, a comparator amplifier for comparing said percentage of said peak value with said zero base line signal, and a relay circuit means driven by said comparator amplifier for holding said display means.

7. The apparatus as described in claim 6, comprising a lock in circuit means for locking the displayed cardiac output signal subsequent to said cut off time.

8. The apparatus as described in claim 7, wherein said lock in circuit means comprises a connection coupling said integrated signal to said comparator amplifier, said connection being unilateral so as to transmit only signals of one polarity to said comparator amplifier.

9. A dilution method for determining fluid flow rate at a point in a fluid system, comprising:
   a. injecting a predetermined amount of injectate into the fluid system, which injectate carries a sensible property;
   b. generating a response signal representing the variation of said property at said point following injection;
   c. detecting when said response signal drops to a predetermined level, said condition defining the cut off time;
   d. integrating said response signal to derive a time varying area signal, and dividing said area signal into a predetermined constant, to derive a time varying output signal; and
   e. holding and displaying the value of said output signal as computed at said cut off time, such cut off value representing fluid flow rate with recirculation error reduced to a negligible level.

10. The method of claim 9 comprising controlling said predetermined amount of injectate so that the peak of said response curve is controlled within a predetermined range.

* * * * *

UNITED STATES PATENT OFFICE
CERTIFICATE OF CORRECTION

Patent No. 3,678,922　　　　　　　　Dated July 25, 1972

Inventor(s) Charles M. Philips and Miguel E. Sanmarco

It is certified that error appears in the above-identified patent and that said Letters Patent are hereby corrected as shown below:

In the Abstract, Line 13, after "apparatus", change "for" to --are--.

Correct the Table in Column 3 to read as follows

--Recirculation　　　　　　　　Cut Off (percent)
　(percent)

| | 6 | 10 | 12 | 15 | 20 | 25 |
|---|---|---|---|---|---|---|
| 0 | +2 | +4 | +5 | +7 | +10 | +13 |
| 2 | -2 | +2 | +3 | +5 | +8 | +12 |
| 3 | -4 | +1 | +2 | +1 | +8 | +11 |
| 4 | -7 | 0 | +1 | +4 | +7 | +10 |
| 8 | | -5 | -3 | +1 | +5 | +9-- . |

Column 4, line 44, change "descent" to --descend--.
Column 5, line 22, delete "peak" and insert --of--.
Column 6, line 31, change "know" to --known--;
　　　　　line 38, change "know" to --known--.

Signed and sealed this 2nd day of January 1973.

(SEAL)
Attest:

EDWARD M. FLETCHER, JR.　　　　　　　ROBERT GOTTSCHALK
Attesting Officer　　　　　　　　　　Commissioner of Patents